United States Patent
Parnell et al.

(10) Patent No.: US 11,803,779 B2
(45) Date of Patent: Oct. 31, 2023

(54) CONSTRUCTING AN ENSEMBLE MODEL FROM RANDOMLY SELECTED BASE LEARNERS

(71) Applicant: International Business Machines Corporation, Armonk, NY (US)

(72) Inventors: Thomas Parnell, Zurich (CH); Andreea Anghel, Adliswil (CH); Nikolas Ioannou, Zurich (CH); Nikolaos Papandreou, Thalwil (CH); Celestine Mendler-Duenner, Wettswil (CH); Dimitrios Sarigiannis, Zurich (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 16/800,040

(22) Filed: Feb. 25, 2020

(65) Prior Publication Data

US 2021/0264320 A1     Aug. 26, 2021

(51) Int. Cl.
*G06N 20/20*     (2019.01)
*G06N 5/01*     (2023.01)

(52) U.S. Cl.
CPC ............... *G06N 20/20* (2019.01); *G06N 5/01* (2023.01)

(58) Field of Classification Search
CPC ................................ G06N 20/20; G06N 5/003
USPC ......................................................... 706/12
See application file for complete search history.

(56) References Cited

U.S. PATENT DOCUMENTS

| 2008/0154567 | A1* | 6/2008 | Qiu ....................... G16B 20/20 703/11 |
| 2018/0122266 | A1* | 5/2018 | Azartash ................. A63H 3/28 |
| 2019/0034830 | A1 | 1/2019 | Burangulov |
| 2019/0095756 | A1 | 3/2019 | Agrawal et al. |
| 2019/0114544 | A1 | 4/2019 | Sundaram et al. |
| 2019/0213685 | A1 | 7/2019 | Ironside |

OTHER PUBLICATIONS

Freund et al., "An Efficient Boosting Algorithm for Combining Preferences", Journal of Machine Learning Research 4 (2003) 933-969 (Year: 2003).*

(Continued)

*Primary Examiner* — Tsu-Chang Lee
(74) *Attorney, Agent, or Firm* — Edward J. Wixted, III (57) ABSTRACT

In an approach for constructing an ensemble model from a set of base learners, a processor performs a plurality of boosting iterations, where: at each boosting iteration of the plurality of boosting iterations, a base learner is selected at random from a set of base learners, according to a sampling probability distribution of the set of base learners, and trained according to a training dataset; and the sampling probability distribution is altered: (i) after selecting a first base learner at a first boosting iteration of the plurality of boosting iterations and (ii) prior to selecting a second base learner at a final boosting iteration of the plurality of boosting iterations. A processor constructs an ensemble model based on base learners selected and trained during the plurality of boosting iterations.

20 Claims, 4 Drawing Sheets

(56) References Cited

OTHER PUBLICATIONS

Chen et al., "XGBoost: A Scalable Tree Boosting System", Proceedings of the 22nd SIGKDD International Conference on Knowledge Discovery and Data Mining, Aug. 2016, San Francisco, California, 13 pages.
Freund et al., "Experiments with a New Boosting Algorithm", Proceedings of the 13th International Conference on Machine Learning (ICML), Jul. 3-6, 1996, Bari, Italy, 9 pages.
Friedman, Jerome, "Greedy Function Approximation: A Gradient Boosting Machine", The Annals of Statistics, 2001, vol. 29, No. 5, pp. 1189-1232.
Hothorn et al., "Model-based Boosting 2.0", Journal of Machine Learning Research vol. 11, Published Aug. 2010, pp. 2109-2113.
Ke et al., "LightGBM: A Highly Efficient Gradient Boosting Decision Tree", Proceedings of the 31st Conference on Neural Information Processing Systems (NIPS 2017), Long Beach, California, Dec. 4-9, 2017, 9 pages.
Lu et al., "Randomized Gradient Boosting Machine", Oct. 2018, 28 pages, <https://arxiv.org/abs/1810.10158>.
Prokhorenkova et al., "CatBoost: unbiased boosting with categorical features", Proceedings of the 32nd Conference on Neural Information Processing Systems (NeurIPS 20018), Dec. 2-8, 2018, Montreal, Canada, 11 pages.
Sigrist, Fabio, "KTBoost: Combined Kernel and Tree Boosting", Oct. 15, 2019, 16 pages, <https://arxiv.org/abs/1902.03999v1>.

\* cited by examiner

CONSTRUCTING AN ENSEMBLE MODEL FROM RANDOMLY SELECTED BASE LEARNERS

BACKGROUND

The present invention relates generally to the field of boosting methods for constructing ensemble models from a set of base learners, and more particularly to approaches relying on randomly selected base learners.

Boosting methods are generic methods for constructing an ensemble model from a set of base learners (also referred to as base regressors). Boosting additively combines base learners by sequentially minimizing a given risk functional. A variety of loss functions (e.g., mean squared error, logistic loss) can be used. Boosting methods can achieve unparalleled accuracy for a variety of machine learning tasks. In addition, fast implementations can be contemplated with modern hardware.

The large majority of boosting algorithms use only one type of function as base learners and decision trees are mostly used in practice. Examples of such boosting methods are the so-called XGBoost, LightGBM, and CatBoost methods. Alternative learners have also been investigated. An alternative approach is to select the learner that minimizes the training loss, at each boosting round, as in the so-called KTBoost method. Additionally, each base learner may be trained on a subset of the training examples and/or a subset of the training features.

SUMMARY

Aspects of an embodiment of the present invention disclose a method, computer program product, and computer system for constructing an ensemble model from a set of base learners. A processor performs a plurality of boosting iterations, wherein: at each boosting iteration of the plurality of boosting iterations, a base learner is selected at random from a set of base learners, according to a sampling probability distribution of the set of base learners, and trained according to a training dataset; and the sampling probability distribution is altered: (i) after selecting a first base learner at a first boosting iteration of the plurality of boosting iterations and (ii) prior to selecting a second base learner at a final boosting iteration of the plurality of boosting iterations. A processor constructs an ensemble model based on base learners selected and trained during the plurality of boosting iterations.

BRIEF DESCRIPTION OF THE DRAWINGS

FIG. 2 is a flowchart illustrating operational steps of an approach to construct an ensemble model, in accordance with an embodiment of the present invention.

FIGS. 3A and 3B illustrate how sampling probability distributions can be changed during the boosting iterations, in accordance with an embodiment of the present invention. Namely, FIG. 3A assumes a scenario, in which the distribution is changed according to a predetermine sequence, while the sampling probability distribution is altered according to feedback collected during the boosting iterations in FIG. 3B. In the illustrated example, such feedback consists of cumulative decrease values of the validation loss attributed to each of the candidate base learners.

FIG. 4 is a block diagram of components of a computerized unit for implementing one or more processes of an embodiment of the present invention.

DETAILED DESCRIPTION

Figure 1:
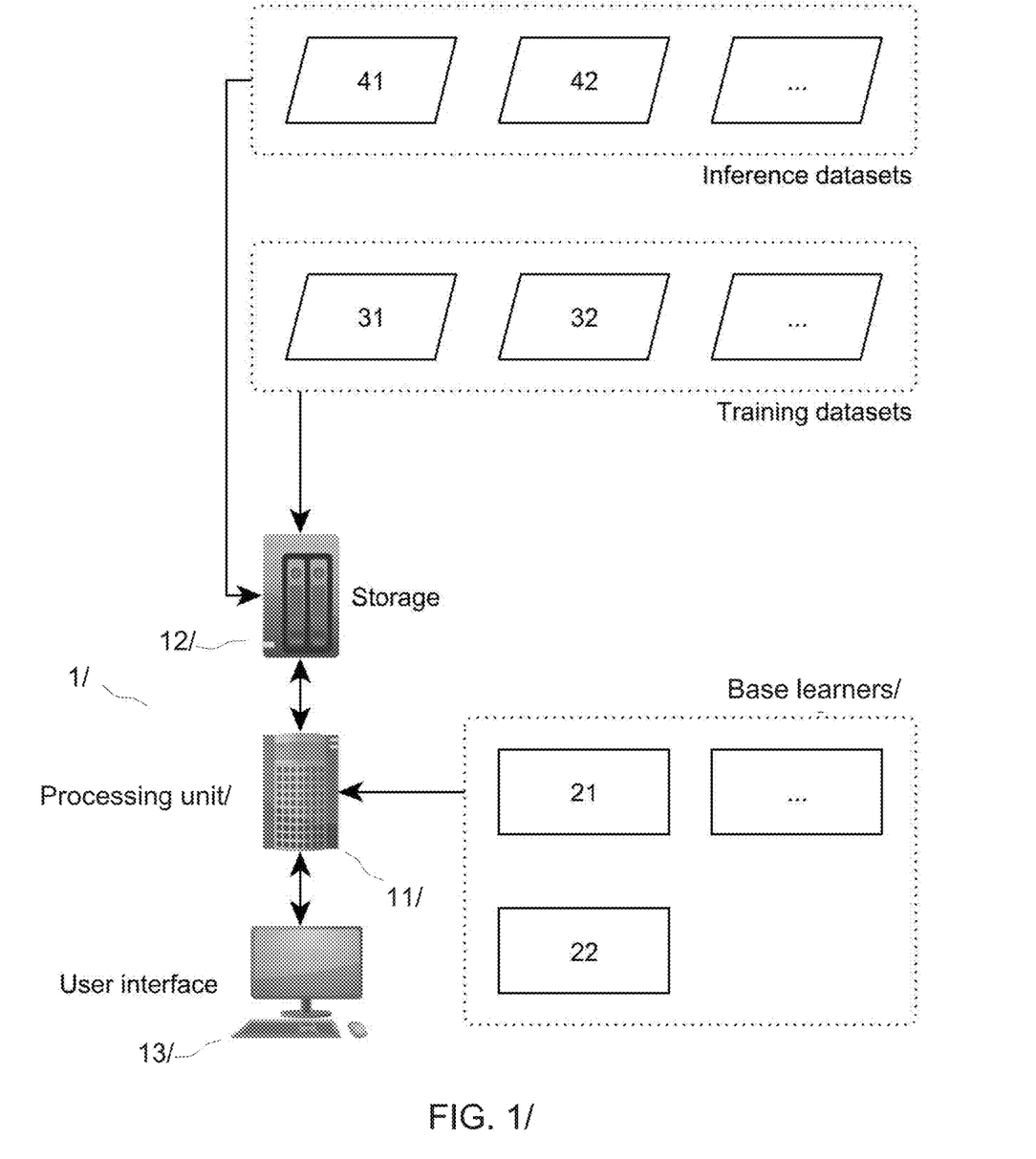
FIG. 1 is a block diagram schematically illustrating selected components of a computer system, in accordance with an embodiment of the present invention.

In reference to FIGS. 1, 2 and 3, embodiments of the invention are first described, which concern a computer-implemented method of constructing an ensemble model from a set of base learners (21, 22), using a computerized system 1 such as shown in FIG. 1.

The present approach revolves around performing several boosting iterations. A base learner (21, 22) is selected S20 at random from a set of candidate base learners (21, 22), at each boosting iteration. That is, the base learner is randomly selected according to a sampling probability distribution of the candidate base learners (21, 22). The selected learner is subsequently trained S30 according to a training dataset (31, 32) and/or an inference dataset (41, 42). The dataset used may remain the same at each iteration. In variants, the datasets used may comprise a randomized subset of the training examples and/or training features.

The sampling probability distribution is altered (see S60) at least once during the performance of the boosting iterations (see S10-S70). That is, the distribution is altered (e.g., a new distribution is selected) after having selected (see S20) a base learner at a first boosting iteration and prior to selecting (see S20) a base learner at the last boosting iteration. The sampling probability distribution (also called "sampling distribution" or, even, "distribution", in this document) of the candidate learners is basically a discrete probability distribution that provides probabilities of occurrence of the learners. The latter can thus be sampled at random from this sampling probability distribution, at each iteration, using, e.g., inverse transform sampling. Examples of such distributions are shown in FIGS. 3A and 3B. The sampling distribution may be altered several times during the overall process.

An ensemble model is constructed (see S80) based on the base learners selected (see S20) and trained (see S30) during said boosting iterations. How to construct an ensemble model is otherwise known per se. The constructed model will then typically be stored (see S90), or distributed, in view of subsequent inference steps (see S100), as illustrated in FIG. 2.

Embodiments of the present solution rely on a boosting method using a set of candidate base learners. However, rather than selecting the base learner that minimizes, e.g., the training loss at each boosting step, embodiments of the present invention select the base learner at random. Rather than sampling the base learner from a uniform sampling distribution, the base learners are selected according to a sampling probability distribution that changes over the boosting iterations. Namely, the base learner is sampled at each boosting round (from the set of candidate base learners), according to a sampling probability distribution that is altered (see S60) at least one time during the boosting steps (i.e., the same sampling distribution may be used for a subset of the boosting iterations, but not all of the iterations). As a result, the base learners will be selected according to at least two distinct sampling probability distributions throughout the various boosting steps. By construction, the distinct sampling distributions will necessarily include at least one non-uniform sampling probability distribution.

Embodiments of the present approach can achieve higher generalization accuracy (i.e., the resulting model can achieve a higher accuracy on new examples that were unseen during training) than existing algorithms in practice, for the following reasons: (i), embodiments of the present approach yield a less biased estimate of the gradient relative to algorithms relying on a single base learner; (ii) embodiments of the present approach lead to less over-fitting relative to algorithms that select base learners so as to minimize the mean squared error; and (iii) altering the random selection of the base learners provides additional stochasticity that allows the algorithm to converge to a wider local minimum.

Any suitable loss function may otherwise be used as a training objective. In some embodiments, the logistic loss is used as the training objective for binary classification problems and the mean squared error may be used as the training objective for regression problems.

According to embodiments of the present approach, the sampling distribution is changed at least once, meaning that the method must involve at least two boosting steps. In that case, an initial distribution (e.g., a uniform distribution) is used to sample a base learner at the first iteration, while a distinct distribution is considered for sampling the second base learner for the second boosting iteration. The sampling probability distribution may possibly be altered (see S60) twice, or more, in which case at least three boosting iterations are performed (see S10-S70). That is, the distribution is altered twice after having selected (see S20) a base learner at the first boosting iteration and prior to selecting (see S20) a base learner at the last boosting iteration. In practice, however, up to 1000 boosting steps may typically be involved. Distinct sampling probability distributions may possibly be used for each boosting iteration. That is, the distribution may be altered (see S60) in view of performing each iteration, i.e., prior to selecting a base learner at each of the boosting iterations but the first iteration, for which an initial distribution is selected or considered, by default.

So, in general, N boosting iterations may be performed (N≥2), while n sampling distributions may be considered throughout the boosting iterations (N≥n≥2) to select (i.e., sample) the base learners. That is, the sampling distribution is altered n−1 times during the boosting iterations.

The sampling probability distribution may possibly be randomly altered (see S60), at some or each of the iterations. That is, distributions may be chosen at random, based on a set of predetermined distributions. Note, the timing at which to alter the distributions may possibly be partly random too. For example, the sampling probability distribution may possibly be randomly altered after the first, second, third, or fourth iteration, where five iterations are used, to add stochasticity.

In variants, the sampling probability distribution is altered (see S60) according to a predetermined sequence, as illustrated in FIG. 3A. That is, a given distribution is selected for a first iteration $i_1$, which is substituted with a second distribution for a second iteration $i_2$, while a third distribution is used at a third iteration $i_3$. Note, the iterations $i_1$, $i_2$, and $i_3$ do not necessarily need to be successive iterations. On the contrary, the distributions may be sequentially changed every m iterations (m>1), for example.

In other embodiments, however, the sampling probability distribution is altered (see S60) according to feedback collected (see S50) during one or more previous boosting iterations, as assumed in the flowchart of FIG. 2. Such feedback is preferably computed (see S50) as the cumulative decreases in the validation loss or the training loss individually attributed to the candidate base learners (21, 22). This may for example be achieved by updating (see S50) corresponding data at the end of each iteration, as in FIG. 2. The sampling probability distribution is then altered (see S60) by constructing a new sampling probability distribution according to the latest cumulative decrease values, so as for the new distribution to be an increasing function of the cumulative decreases (e.g., the new sampling probability distribution is most simply taken to be proportional to the cumulative decrease values obtained for the learners). This is illustrated in FIG. 3B. Initially, a uniform distribution of the base learners is assumed for the first iterations. Thus, base learners are first uniformly sampled at random at each of the first k iterations (k>1), during which the cumulative decrease in validation loss is updated (see S50) for each candidate learner. Upon completing said k iterations, the cumulative decrease attributed to each base learner is considered to shape a new distribution, proportionally to the values of the cumulative decreases obtained, which gives rise to a non-uniform distribution. The latter is then used to sample base learners at random at each of the next iterations. In this example, the sampling distribution is altered only once. The process is stopped upon completing the Kth boosting iteration and an ensemble model is finally obtained (see S80) based on all trained learners.

In the examples in FIGS. 3A and 3B, the set of candidate base learners comprises three base learners. At least two base learners are needed, in principle. In practice, however, eight, ten, or more candidates may be used. In addition, in the examples of FIGS. 3A and 3B, the candidate base learners are assumed to be learners of distinct types, e.g., a decision tree learner, a Gaussian kernel learner, and a polynomial kernel learner. However, other known learners may possibly be used, such as lasso learners and kernel ridge learners. Other variants may involve base learners of a same type albeit with distinct parameterizations. For example, one may use decision tree learners of different maximal depths.

Note, the vagaries of the training may possibly cause the sampling distribution p to be altered so as to occasionally allow degenerative cases (e.g., p=[1, 0, 0], [0, 1, 0], or [0, 0, 1]), whereby a given base learner may occasionally be forced to be selected from a single base learner.

Referring to FIGS. 1 and 4, another aspect of the invention is now described, which concerns a computer system 1. The computer system 1 comprises memory storage (12, 120) storing one or more training datasets (31, 32), as well as instructions. The system 1 further includes processor(s) (11, 105) configured to execute said instructions which causes the computer system 1 to perform several boosting iterations as described earlier in reference to the present methods. That is, at each of said boosting iterations, a base learner is selected at random from candidate base learners, according to a sampling probability distribution of the base learners, and trained according to a given one of the datasets (31, 32). Again, the sampling probability distribution is altered (see S60) at least once after completing (see S70) a first boosting iteration and prior to performing a last boosting iteration. Finally, an ensemble model is constructed based on the base learners selected and trained (see S30) during the boosting iterations, e.g., upon completing the last iteration.

In the example of FIG. 1, the system is assumed to comprise a storage unit 12 that is distinct from (but in data communication with) the processing unit 11 used to execute said instructions. The processing unit 11 is itself connected to some user interface 13. The units 11, 12 may, in variants, form a single computing device 101 such as depicted in FIG. 4.

Computing devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented, wherein general-purpose digital computers, such as personal computers, workstations, etc., are used.

For instance, FIG. 4 depicts a computing device 101, e.g., a general-purpose computer. In exemplary embodiments, in terms of hardware architecture, as shown in FIG. 4, the computing device 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses 140 or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computing device 101, a semiconductor-based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 4, the software in the memory 110 includes methods described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, the program needs to be translated via a compiler, assembler, interpreter, or the like, which may or may not be included within the memory 110, so as to operate properly in connection with the OS 111. Furthermore, the methods can be written as an object-oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices. In addition, the I/O devices 145-155 may further include devices that communicate both inputs and outputs. The system 100 can further include a display controller 125 coupled to a display 130. In exemplary embodiments, the system 100 can further include a network interface or transceiver 160 for coupling to a network (not shown in FIG. 4).

The network transmits and receives data between the computing device 101 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the computing device 101 and any external server, client and the like via a broadband connection. In exemplary embodiments, network can be a managed IP network administered by a service provider. Besides, the network can be a packet-switched network such as a LAN, WAN, Internet network, etc.

If the computing device 101 is a PC, workstation, intelligent device or the like, the software in the memory 110 may further include a basic input output system (BIOS). The BIOS is stored in ROM so that the BIOS can be executed when the computing device 101 is activated.

When the computing device 101 is in operation, the processor 105 is configured to execute software stored within the memory 110, to communicate data to and from the memory 110, and to generally control operations of the computing device 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

Next, according to a final aspect, the invention is embodied as a computer program product, which comprises a computer readable storage medium having program instructions embodied therewith. The program instructions are executable by one or more processors of a computerized system such as shown in FIG. 1 or 4 to cause the system to take steps according to the present methods.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:
1. A computer-implemented method comprising:
  performing, by one or more processors, a plurality of boosting iterations, wherein:
    the plurality of boosting iterations comprises at least one thousand boosting iterations;

each boosting iteration comprises:
  selecting, by one or more processors, a base learner at random from a set of candidate base learners, according to a sampling probability distribution of the set of base learners, wherein the sampling probability distribution is a discrete probability distribution that provides probabilities of occurrence of the base learners; and
  training, by one or more processors, the selected base learner according to a training dataset; and
altering, by one or more processors, the sampling probability distribution: (i) after selecting a first base learner from the set of candidate base learners at a first boosting iteration of the plurality of boosting iterations and (ii) prior to selecting a second base learner from the set of candidate base learners at a final boosting iteration of the plurality of boosting iterations, wherein altering the sampling probability distribution comprises changing the discrete probability distribution that provides the probabilities of occurrence of the base learners;
constructing, by one or more processors, an ensemble model based on base learners selected and trained during the plurality of boosting iterations; and
performing, by one or more processors, an inference based on the ensemble model.

2. The method of claim 1, wherein:
performing the plurality of boosting iterations comprises performing, by one or more processors, at least three boosting iterations; and
the sampling probability distribution is altered at least twice: (i) after selecting the first base learner at the first boosting iteration of the plurality of boosting iterations and (ii) prior to selecting the second base learner at the final boosting iteration of the plurality of boosting iterations.

3. The method of claim 2, wherein:
the sampling probability distribution is altered prior to selecting a respective base learner for each boosting iteration of the plurality of boosting iterations, excluding the first boosting iteration.

4. The method of claim 1, wherein:
the sampling probability distribution is randomly altered.

5. The method of claim 1, wherein:
the sampling probability distribution is altered according to a predetermined sequence.

6. The method of claim 1, wherein:
the sampling probability distribution is altered according to feedback collected at one or more previous boosting iterations of the plurality of boosting iterations.

7. The method of claim 6, wherein:
the feedback comprises values of cumulative decreases in a selection from the group consisting of: a validation loss and a training loss; and
the values are attributed to respective base learners of the set of base learners.

8. The method of claim 7, wherein:
the sampling probability distribution is altered by constructing a second sampling probability distribution according to the values of cumulative decrease, so as for the second sampling probability distribution to be an increasing function of the values of cumulative decreases.

9. The method of claim 8, wherein:
the second sampling probability distribution is constructed so as to be proportional to the values of cumulative decreases.

10. The method of claim 6, wherein:
the sampling probability distribution used for the first boosting iteration is a uniform sampling probability distribution.

11. The method of claim 1, wherein:
the set of base learners comprises at least three base learners.

12. The method of claim 1, wherein:
the set of base learners comprise distinct types of base learners.

13. The method of claim 1, wherein:
the set of base learners comprise base learners of the group consisting of: a decision tree learner; a lasso learner; a kernel ridge learner; a Gaussian kernel learner; and a polynomial kernel learner.

14. The method of claim 1, wherein:
the set of base learners comprise at least two base learners of a same type that have distinct parameters.

15. The method of claim 14, wherein:
the at least two base learners of the same type are decision tree learners of different maximal depths.

16. A computer program product comprising:
one or more computer readable storage media and program instructions collectively stored on the one or more computer readable storage media, the program instructions comprising:
program instructions to perform a plurality of boosting iterations, wherein:
  the plurality of boosting iterations comprises at least one thousand boosting iterations;
  each boosting iteration comprises:
    selecting, by one or more processors, a base learner at random from a set of candidate base learners, according to a sampling probability distribution of the set of base learners, wherein the sampling probability distribution is a discrete probability distribution that provides probabilities of occurrence of the base learners; and
    training, by one or more processors, the selected base learner according to a training dataset; and
  program instructions to alter the sampling probability distribution (i) after selecting a first base learner from the set of candidate base learners at a first boosting iteration of the plurality of boosting iterations and (ii) prior to selecting a second base learner from the set of candidate base learners at a final boosting iteration of the plurality of boosting iterations, wherein altering the sampling probability distribution comprises changing the discrete probability distribution that provides the probabilities of occurrence of the base learners;
program instructions to construct an ensemble model based on base learners selected and trained during the plurality of boosting iterations; and
program instructions to perform an inference base don the ensemble model.

17. The computer program product of claim 16, wherein:
program instructions to perform the plurality of boosting iterations comprise program instructions to perform at least three boosting iterations; and
the sampling probability distribution is altered at least twice: (i) after selecting the first base learner at the first boosting iteration of the plurality of boosting iterations and (ii) prior to selecting the second base learner at the final boosting iteration of the plurality of boosting iterations.

18. The computer program product of claim 17, wherein:
the sampling probability distribution is altered prior to selecting a respective base learner for each boosting iteration of the plurality of boosting iterations, excluding the first boosting iteration.

19. A computer system comprising:
one or more computer processors, one or more readable storage media, and program instructions collectively stored on the one or more computer readable storage media for execution by at least one of the one or more computer processors, the program instructions comprising:
program instructions to perform a plurality of boosting iterations, wherein:
  the plurality of boosting iterations comprises at least one thousand boosting iterations;
  each boosting iteration comprises:
    selecting, by one or more processors, a base learner at random from a set of candidate base learners, according to a sampling probability distribution of the set of base learners, wherein the sampling probability distribution is a discrete probability distribution that provides probabilities of occurrence of the base learners; and
    training, by one or more processors, the selected base learner according to a training dataset; and
  program instructions to alter the sampling probability distribution (i) after selecting a first base learner from the set of candidate base learners at a first boosting iteration of the plurality of boosting iterations and (ii) prior to selecting a second base learner from the set of candidate base learners at a final boosting iteration of the plurality of boosting iterations, wherein altering the sampling probability distribution comprises changing the discrete probability distribution that provides the probabilities of occurrence of the base learners;
program instructions to construct an ensemble model based on base learners selected and trained during the plurality of boosting iterations; and
program instructions to perform an inference base don the ensemble model.

20. The method of claim 1, wherein:
the sampling probability distribution is altered at least twice: (i) after selecting the first base learner at the first boosting iteration of the plurality of boosting iterations and (ii) prior to selecting the second base learner at the final boosting iteration of the plurality of boosting iterations.

* * * * *